US005920024A

United States Patent [19]

Moore

[11] Patent Number: 5,920,024

[45] **Date of Patent: *Jul. 6, 1999**

[54] APPARATUS AND METHOD FOR COUPLING SOUND TO MOTION

[76] Inventor: Steven Jerome Moore, 9 Sonoma Rd., Cortlandt Manor, N.Y. 10566

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,892

[22] Filed: Jan. 2, 1996

[51] Int. Cl.[6] .............................. G01P 3/36; G02B 17/00; G10H 1/053

[52] U.S. Cl. .............................. 84/609; 84/615; 84/626; 84/658; 84/DIG. 7; 356/28; 356/29; 359/591

[58] Field of Search .............................. 84/600, 615–620, 84/626–633, 658, 711, 721, 737–741, 20–22, DIG. 7, 609–614, 634–638, 649–652, 666–669; 356/28, 28.5, 29, 236; 359/591–598

[56] References Cited

U.S. PATENT DOCUMENTS

| | | | |
|---|---|---|---|
| 3,749,810 | 7/1973 | Dow | 84/721 X |
| 3,922,944 | 12/1975 | Kurosaki et al. | 84/721 |
| 4,120,582 | 10/1978 | De Vries et al. | 356/236 X |
| 4,121,488 | 10/1978 | Akiyama | 84/DIG. 7 |
| 4,341,140 | 7/1982 | Ishida | 84/711 |
| 4,351,221 | 9/1982 | Starnes et al. | 84/21 X |
| 4,362,934 | 12/1982 | McLey | 84/DIG. 7 |
| 4,593,592 | 6/1986 | Stahnke | 84/21 |
| 4,620,771 | 11/1986 | Dominguez | 359/591 |
| 4,662,260 | 5/1987 | Rumsey | 84/DIG. 7 |
| 4,995,294 | 2/1991 | Kashio et al. | 84/DIG. 7 |
| 5,140,886 | 8/1992 | Masaki et al. | 84/627 X |
| 5,192,823 | 3/1993 | Suzuki et al. | 84/600 |
| 5,192,826 | 3/1993 | Aoki | 84/737 |
| 5,200,562 | 4/1993 | Kaneko et al. | 84/21 |
| 5,200,568 | 4/1993 | Fukushima et al. | 84/658 |
| 5,266,737 | 11/1993 | Okamoto | 84/626 |
| 5,541,358 | 7/1996 | Wheaton et al. | 84/658 X |

*Primary Examiner*—Stanley J. Witkowski

[57] ABSTRACT

There is described a motion-to-sound apparatus which provides for musical scores and accompaniments, and lyrics and in response to a movement in three-dimensional space along more than one plane. Further disclosed is a motion-to-sound apparatus for producing sounds responsive both to the final position, or direction of movement, of the detector in space and the acceleration of the device towards that position or along that plane. Control of sound production is oriented such as to be intuitively familiar.

20 Claims, 10 Drawing Sheets

APPARATUS AND METHOD FOR COUPLING SOUND TO MOTION

BACKGROUND OF INVENTION

1. Field of Invention

The present invention relates generally to a method and device which couples the production of sound with motion. In particular, it relates to a method and device for producing sound responsive to x-y-z co-ordinate movement.

2. Brief Description of the Prior Art

Many devices are known in the art to produce sounds. The coupling of sounds of different pitch, frequency, and volume results in what we refer to as music. Studies have shown that music can have a profound effect on the human psyche. A common effect of music is to cause people to move various parts of their body, primarily the hands and legs, in conjunction with the rhythm of the music.

People also respond to certain sounds not considered music with physical motions. For example, persons in a movie often react to the sound of fist fighting by moving their own arms. The physiological reasons for these reactions are not entirely understood. Numerous means have been devised in the art to elicit physical reaction to sound, for example, interactive video-audio games.

Physical manipulations have been used for centuries to produce sounds and music. However, until very recently the production of sound by such physical manipulations generally has been limited to manipulations specifically directed towards a device for producing set sounds.

U.S. Pat. No. 4,627,324 to Zwosta describes a method and apparatus for generating acoustic effects without directing physical manipulations toward a sound producing device. According to the 4,627,324 invention, any desired number of transducers are attached to the human body which transducers cause characteristic electrical signals to be generated upon characteristic human body actions. The characteristic electrical signals are transmitted to signal generators via a logic circuitry. The signal generators provide electrical signals associated with the human body actions and are transmitted to electro/acoustic and/or electro/visual converting means.

U.S. Pat. Nos. 4,905,560, 4,977,811 and 5,022,303 describe musical tone control apparatuses for mounting on a person's limbs which are responsive to bending angles. U.S. Pat. No. 4,905,560 describes a musical tone control apparatus detecting means for detecting movement of a player's elbow and/or shoulder joint and the movement of a player's wrist and/or each finger joint. U.S. Pat. No. 4,977,811 discloses an angle sensor for attachment to an articulating joint of the human body comprising a pair of plate members coupled pivotally around an axis parallel to both faces of the plate members. U.S. Pat. No. 5,022,303 describes use of a bending angle sensor to control the tone pitch of a musical tone by judging the increasing or decreasing tendency of the bending angle based on present angle input and a prior angle input.

U.S. Pat. Nos. 5,005,460, 5,151,553 and 5,125,313 describe mechanisms for detecting movement of the digits of the hand. U.S. Pat. No. 5,005,460 describes a joint switch mechanism for attachment to the fingers. Such joint switches are mounted at a joint portion of each finger member and are turned on when the corresponding finger is bent. U.S. Pat. No. 5,151,553 describes digit members worn along the fingers which contract and expand in longitudinal directions of the digit members in response to the bending and straightening of the fingers. Digit members are made to bend about the axes positioned on the third joint of the fingers or the second joint of the thumb in order to make bending of the digit easier. U.S. Pat. No. 5,125,313 describes a finger detecting means for detecting the variable degree of the positions of a player's fingers and for detecting the variable degree of pressure applied by the fingers of a player's hand. A holder providing four voltage generators which is placed on the thumb with a plurality of strings emanating therefrom are disclosed for mounting on a player's hand.

In order to avoid unwanted pitch bender and/or vibrato functions owing to unintended motions, U.S. Pat. No. 5,373,096 describes a control signal generation means which provides for a musical control signal only at certain predetermined touch intensities below which no musical control signal is generated.

Several motion-to-sound devices responsive to motion but which are not designed for attachment to the body are known. Probably among the simplest of these is the maraca, a rattle-like gourd. Electronic-based devices activated by swinging are also known. U.S. Pat. Nos. 4,995,294, 5,127,213, and 5,350,881 to Kashio describe a striker resembling a drumstick which is designed to produce sounds upon activation of a musical sound-initiating command signal-generating device. A simple contact-style switch is disclosed in all three patents to be housed within the head of the drumstick. U.S. Pat. No. 5,192,823 discloses a musical tone apparatus including at least one stick to be held by a person's hand and at least one detector to be attached to a person's leg. The stick and detector are respectively equipped with sensors each detecting a physical parameter accompanied with a movement thereof.

More complex devices which are not dependent on simple switch mechanisms are described in U.S. Pat. No. 5,125,313. The 5,125,313 patent describes an embodiment wherein the use of bone conduction microphones are used to adjudge motion by picking up vibrational tones of the bones as a person moves.

Several problems are associated with present day motion-to-sound devices. Devices coupled to the body tend to be cumbersome and annoying, thereby inhibiting to a significant extent the enjoyment produced by using the device. Devices designed to be activated by swinging the arm, while much less unwieldy, tend to be monotonous permitting only but a few timbres for a given musical note. None of these devices provide the degree of spatially-separated musical repertoire, such as note, pitch, tone, tone color, timbre, and volume variability, which are desired in using such devices. Rather, variation of such repertoire is generally limited by present day devices to, at most, defined planes.

The 5,125,313 patent, described above with reference to simple and more complex actuating devices, attempts to broaden the degree of musical repertoire available to a person using a motion-to-sound device in describing an embodiment employing the use of ultrasonic transmitting/receiving devices coupled to the body of a player. Such embodiment provides for a means for determining the distance between the transmitter and receiver based on the period of time between when the ultrasonic transmitter transmits an ultrasonic wave and the ultrasonic receiver receives the wave, thus, in theory, permitting a larger number of distinguishable actuations than simple contact-style switches. The distance differential is used to control the tone produced by a musical tone signal generating device.

The ultrasonic distance-measurement embodiment of the 5,125,313 patent also suffers from several drawbacks. For one, such system requires employment of relatively complex and exacting signal-processing techniques. Furthermore, such embodiment requires that the transmitter be positioned such that the receiver will always receive the transmitted signal regardless of the motion performed—this may be quite difficult. Distance measurements may be significantly effected by signals bouncing off masses in the vicinity of the person and may not truly reflect the distance between the transmitter and receiver. This approach also suffers from the disadvantage that a plurality of coordinate positions will eventuate in the same actuation, that is will produce the same distance between the transmitter and receiver, thereby failing to distinguish distinctly different 3-D spatial locations in which actuation of different tones may be desired. Lastly, this approach continues to envision such instrumentation being attached to the body, such attachment in some cases, as stated above, inhibiting the enjoyment of the device.

Presently available motion-to-sound devices may also be said to suffer from an intrinsic deficit with respect to their sound-generation design. Such design continues to think in terms of notes and tones, as if an actual instrument was being played. The fact is that most people are not musicians, and that the musically-disinclined tire quickly of attempting to order tones and sounds in succession in such a way that a pleasing melodic sound is produced. Furthermore, with present day electronic motion-to-sound devices which produce a variety of tones, the player must take time to familiarize himself with the sound produced by a particular motion. The relationship between a spatial orientation and the sound produced is often not intuitive or psychologically appealing. Enjoyment value of motion-to-sound devices could considerably be enhanced if the sound-generation devices employed musical scores and accompaniments which a person could relate to, rather than simple notes and tones that often represent an abstraction. Furthermore, enjoyment would be enhanced if the device could relate discrete spatial movements to particular intuitive sounds. For example, lifting of the leg in a quick jerky motion could eventuate in the sound of a "kick." Likewise, moving the arm rapidly in an upward motion could eventuate in the sound of a "punch." Volume and pitch could also be adjusted in an intuitive manner —motion directed upward causing an increase in volume and/or pitch, a motion directed downward causing a decrease in volume and/or pitch.

While, heretofore, motion-to-sound devices have not found application beyond their entertainment value, such devices also may have wider uses. These devices may lend enjoyment not only to the hearing, but portend usefulness in aiding people who are unable to enjoy sound due to a hearing deficit. Such persons often are unable to communicate with others except by means of physical manipulation of body parts, especially the arms and hands. In particular, languages referred to as "sign languages" have evolved which permit communication without the need for verbalization. A major problem with sign languages is that they require the person to whom the communication is directed to understand what each physical manipulation means. Heretofore, there has been no means of converting such manipulations into verbalizations.

OBJECTS AND SUMMARY OF THE PRESENT INVENTION

It is the general object of the present invention to provide an apparatus and method for generating sounds and music in response to a motion. It is a more specific object of the present invention to provide sounds and music which correlate to x-y-z coordinate movement. In consideration of the shortcomings of conventional motion-to-sound devices, there is described a motion-sensitive apparatus which provides for musical scores, accompaniments, and lyrics, and which is responsive to movement in more than one plane. Control of sound production is oriented such as to be intuitively familiar.

The present invention relates to an apparatus for generating sounds in response to a movement in three-dimensional space. The apparatus comprises one or more motion detectors, data processing units, and sound generating devices. The apparatus may also be provided with a one or more light or laser generating devices.

In one embodiment of the invention, one or more motion detectors capable of detecting motion in the x and/or y and/or z planes of three-dimensional space, and/or motion between said planes, are electronically coupled with a data processing unit. The data processing unit is pre-programmed to vary its output according to the input signals received from the motion detectors. Passage of signals from the detectors to the data processing unit may be screened by means of one or more of comparators permitting passage only of signals above a certain threshold level. A comparator may also be used to permit only the largest signal from an x/y/z motion detector to pass to the data processing unit, thus eliciting sound correlating to the predominant axis movement. The data processing unit is electronically coupled to a one or more sound generating devices activated by output from the data processing unit depending on the type of motion detected. The one or more sound generating devices may be microprocessor based and may produce one type of sound, a pre-programmed sound tract or portion thereof, or different sounds dependent upon the output from the data processing unit.

In another embodiment of the invention, the central processing unit receives both directional or positional data and data relating to the acceleration or velocity of movement in such direction or toward such position. The central processing unit of this embodiment is pre-programmed to produce different sounds as related to different directional motion/position and acceleration/velocity paired readings.

A further aspect of the present invention is directed to a motion-to-sound apparatus for producing sound in response to movement comprising: a means for x, y and z coordinate movement in space; a data processing unit electronically coupled to the means for detecting motion such as to receive input from the means for detecting motion; a sound generating device electronically coupled to the data processing unit such as to receive input from the data processing unit. The motion-to-sound apparatus means for detecting motion may comprise one or more flexible conductors disposed along the x, y and z axis in static non-contact locational proximity to one or more electrical contacts such that when motion is made the x, y and/or z axis, one or more of such flexible conductors make electrical contact with the one or more proximity electrical contacts such that current flows between a number of the conductors and electrical contacts. The motion-to-sound apparatus movement detection may also comprise one or more flexible electrical contacts disposed along the x, y and z axis in static non-contact locational proximity to one or more conductors such that when motion is made along the x, y and/or z axis, one or more of said flexible electrical contacts make electrical contact with the one or more proximity conductors such that current flows between a number of the conductors and electrical contacts. Said conductors and electrical contacts in locational proximity with each other may be housed in a flexible housing member. The flexible housing members may be housed in a motion detection housing permitting disposition of certain of the housing members along the x, y and z-axis. And yet, the movement detection means may comprise a housing having an outer surface and an inner surface; a relatively non-conducting fluid disposed in the housing; one or more paired electrical contacts disposed along the inner surface of the housing; a conducting object within the housing, the conducting object being of such density and buoyancy such as to remain suspended in said relatively non-conducting fluid at a static position so as to be non-contactedly approximately equidistant from each set of said paired electrical contacts, and of such size and shape as to permit contact with only one pair of electrical contacts when motion along one axis is made.

The motion-to-sound apparatus embodiment of the present invention may further comprise a means for detecting acceleration or velocity of a motive force, the means for detecting acceleration or velocity providing input to the data processing unit.

Several types of motion directors may be employed in the motion-to-sound apparatus of the present invention.

In one embodiment of the invention the direction of motion is detected by means of one or more flexible conductors disposed along the x, y or z plane, or in such a manner as to detect motion in the x, y or z plane. Such flexible conductors are in proximity to one or more contact members such that when motion is made in the plane of their disposition one or more of such flexible conductors make electrical contact with said proximity contact members such that current flows between the conductor and contact. Alternatively, the contact members may be located on flexible structures and the conductors may be rigid or semi-rigid, movement of the flexible contact members causing contact with the conductors. Rotational movement can be detected by means of a number of conductors capable of rotation which are disposed in circumferential proximity to a number of contact members such that when rotational motion occurs one or more of such rotational conductors make electrical contact with said proximity contact members such that current flows between the conductor and contact.

In another embodiment of the invention the direction of motion is detected by means of a motion sensitive conductor member having multiple protrusions disposed in the x, y and z plane and/or in planes tangential to the intersection of the x-y-z planes, e.g. "jack"-like probes attached at one protrusion to a flexible spring coil. The plurality of protrusions are disposed in proximity to contact members such that when motion is made in a plane of disposition of one or more such protrusions, said protrusions make electrical contact with said proximity contact members such that current flows between the conductor and contact.

In yet another embodiment of the invention directional motion is detected by means of a laser gyroscope.

In yet another embodiment of the invention positional and directional information pertaining to movement along an axis is detected by a magnetic field sensitive device comprising: one or more of paired photodiodes and photovoltaic cells disposed in such a manner that the interaction of one pair does not interfere with the interaction of another pair, a magnetically responsive member disposed as to be capable of interfacing with the interaction of one or more photodiode-photovoltaic cell pairs at a time, and a processing means for processing data with respect to the pair or pairs of photodiode-photovoltaic cell interactions interfered with by the magnetically responsive member in a set period of time.

In yet another embodiment, positional and directional motion is detected by a laser device comprising: photodetectors dispersedly disposed along the inner surface of a sphere, an means capable of maintaining angular reference direction disposed within the sphere, a laser emitting source positioned on said reference means, a means for electronically coupling the signal produced by a photodetector exposed to said laser beam with a data processing unit or sound generation device.

In yet another embodiment of the present invention there is disclosed a directionally-sensitive motion detection means comprising: a base; an electrically conductive member having a plurality of protrusions; a flexible means for attaching the electrically conductive member to said base; a means for electronically connecting the electrically conductive member to an energy source; a plurality of contact means disposed proximately to the protrusions of the electrically conductive member; a means for electronically connecting the plurality of contact means with an output detection means.

The motion-to-sound apparatus of the present invention may also utilize any of the many known motion detectors of the prior art.

Motion detectors of the present invention are preferably housed in or on a hand-held object of varying shapes and forms, as for example, a conductor's wand. Such detectors, however, may be housed in or on bands for attachment to body parts.

The present invention encompasses the concept that the sound produced may be musical, non-musical, within or without the range of hearing of human beings. For example, the sound produced by thrusting a fist in the air may be that of punching. Likewise, the sound produced by thrusting a leg into the air may be that of kicking. Likewise, the sound produced by angularly moving the arms and legs may be that of the "whooshing" sound associated with karate movements.

The present invention also encompasses the concept that the sound produced could be a voice simulation. For example, a plurality of motion sensitive detectors could be attached to positions along the finger, such as over the metacarpus and each of the phlanges. The data processing unit could be programmed such that a series of inputs from the motion detector probes could be computationally-associated with a voice string. For example, movement of the forefinger towards the thumb may result in an output from the data processing unit to cause the production of the sound "OK."

Delay in production of the sound after receipt of the signal from the motion sensitive probes is also encompassed and may be produced by software programming or by use of an appropriate analog circuit such as a phantastron.

Furthermore, the device may be coupled to any moving object, including animals.

There are many possible modifications and changes which could be made to the system without straying from the applicants's present invention. Such modifications would be obvious to those skilled in the art and should not limit the scope of applicant's claimed invention.

BRIEF DESCRIPTION OF THE DRAWINGS

For a more complete understanding of the objects of the present invention, the Detailed Description of the Illustrative Embodiments thereof is to be taken in connection with the following drawing in which.

DETAILED DESCRIPTION OF THE ILLUSTRATIVE EMBODIMENT OF THE PRESENT INVENTION

Figure 1:
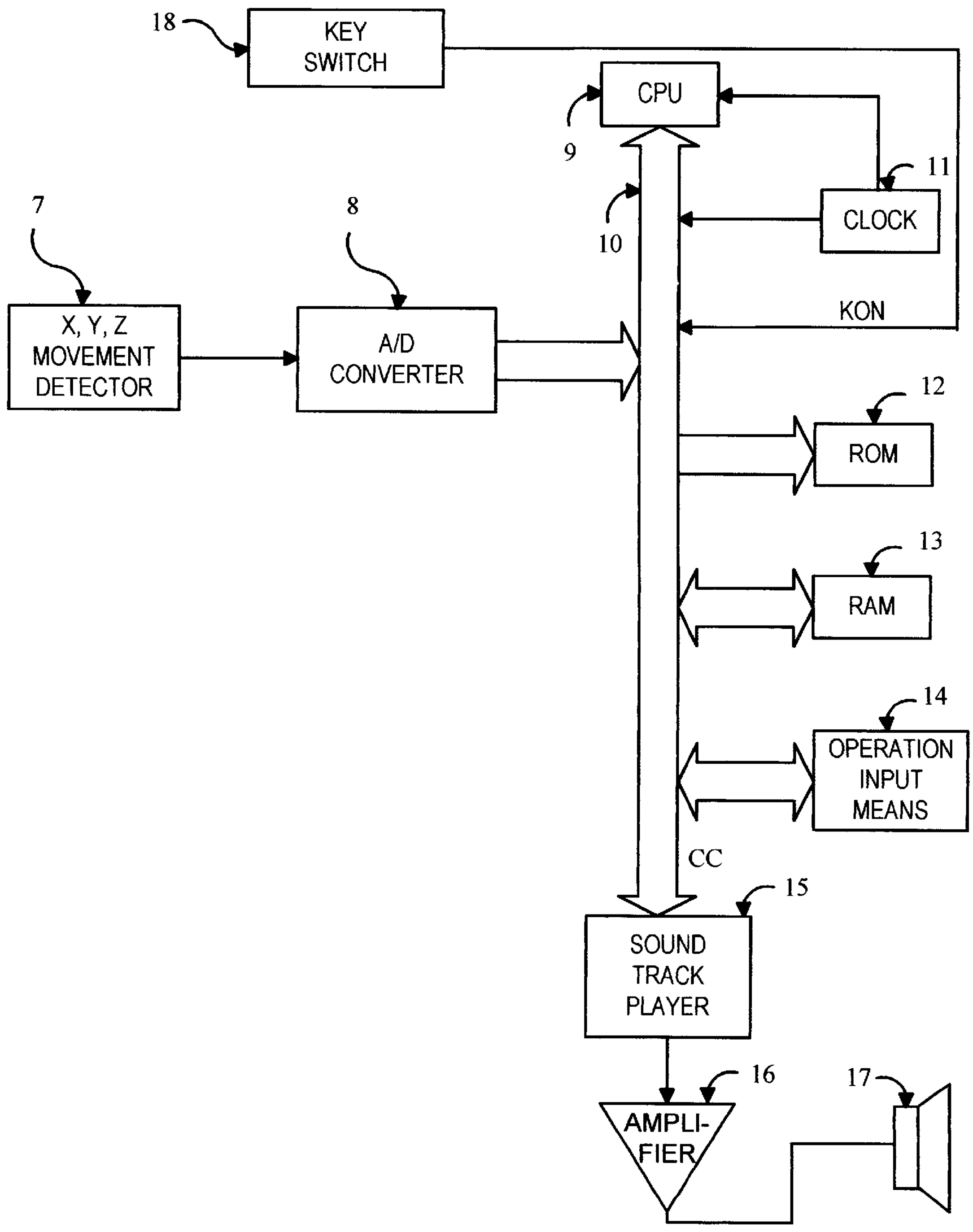
FIG. 1 is a block diagram showing an electronic configuration of a motion-to-sound apparatus employing one or more of x-y-z motion detectors according to an embodiment of the present invention.

Now referring to FIG. 1, there is shown a block diagram illustrating an electronic configuration of a motion-to-sound apparatus according to an embodiment of the present invention. Movement detector 7, responsive to movement along the x-axis, the y-axis and z-axis provides digital input by means of analog-to-digital converter 8 to central processing unit ("CPU") 9 via bus line 10. CPU 9 is coupled to a read-only-memory 12 for storing programs used in CPU 9 and to a random-access-memory ("RAM") 13 which is used as a work area. Clock 11 functions to synchronize the operations of CPU 9 with other devices coupled to bus line 10. CPU 9 receives command inputs from operation input means 14 which includes a power switch and one or more designation switches which designate such sound track player 15 control functions as pitch, FAD or time of play. CPU 9 is programmed in response to a key-on signal ("KON") from key switch 18 to detect the axis(es) of movement and to adjust the play of one or more tracks of sound track player 15 by provision of control commands ("CC") in accordance with input of operation input means 14. Sound track player 15 is coupled to amplifier 16 for amplifying its output, and thereby coupled to speaker 17 where electrical output of sound track player 15 is converted to audible sound. Sound track player 15 may be replaced with a voice or sound microchip-based processor programmed as to response to control commands from CPU 9. Such voice or sound processors would permit a large variety of auditory responses to movement including the transmission of language phrases.

Figure 2:
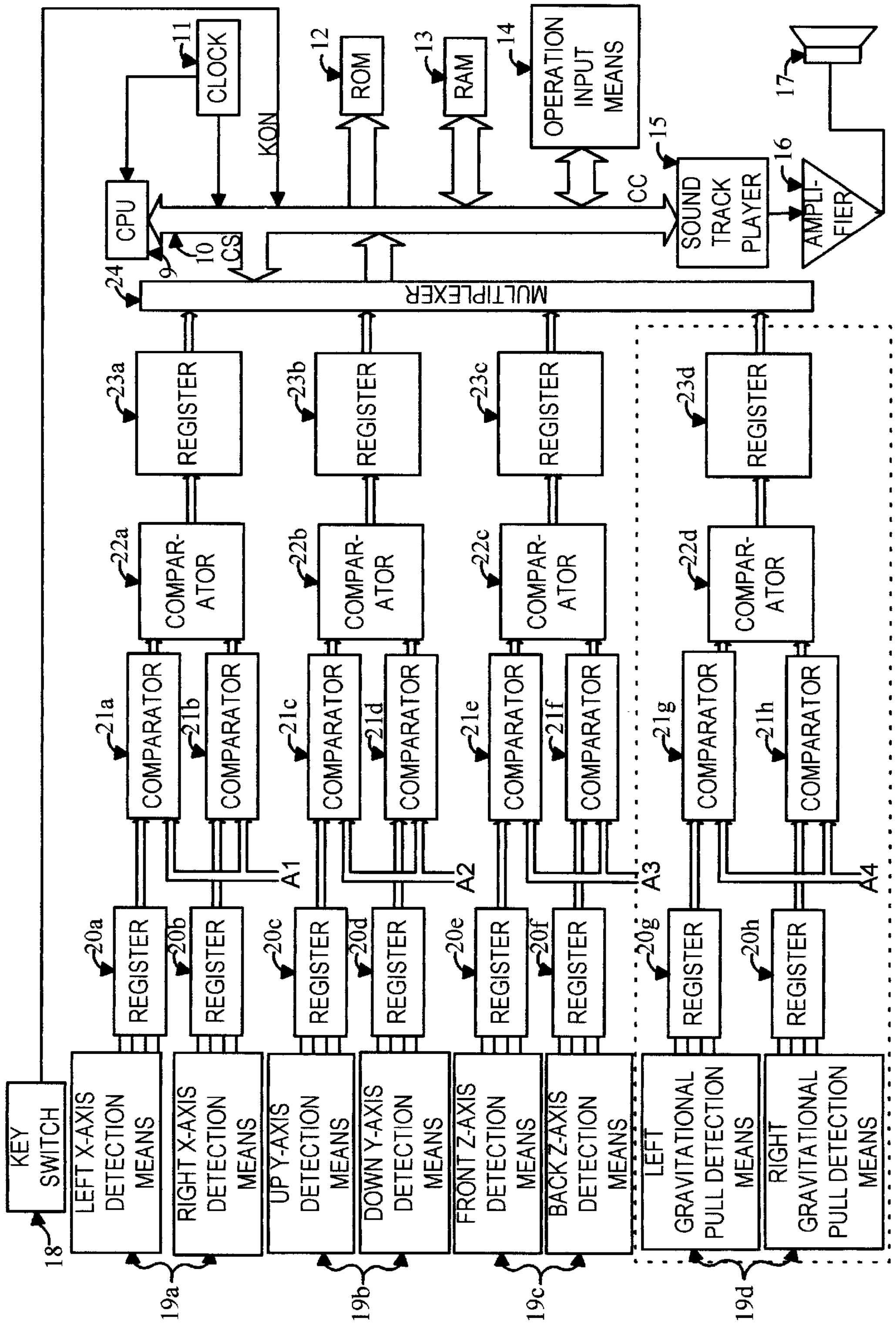
FIG. 2 is a block diagram illustrating an electronic configuration of a motion-to-sound apparatus responsive to adjudged directional movement according to an embodiment of the present invention.
Figure 4:
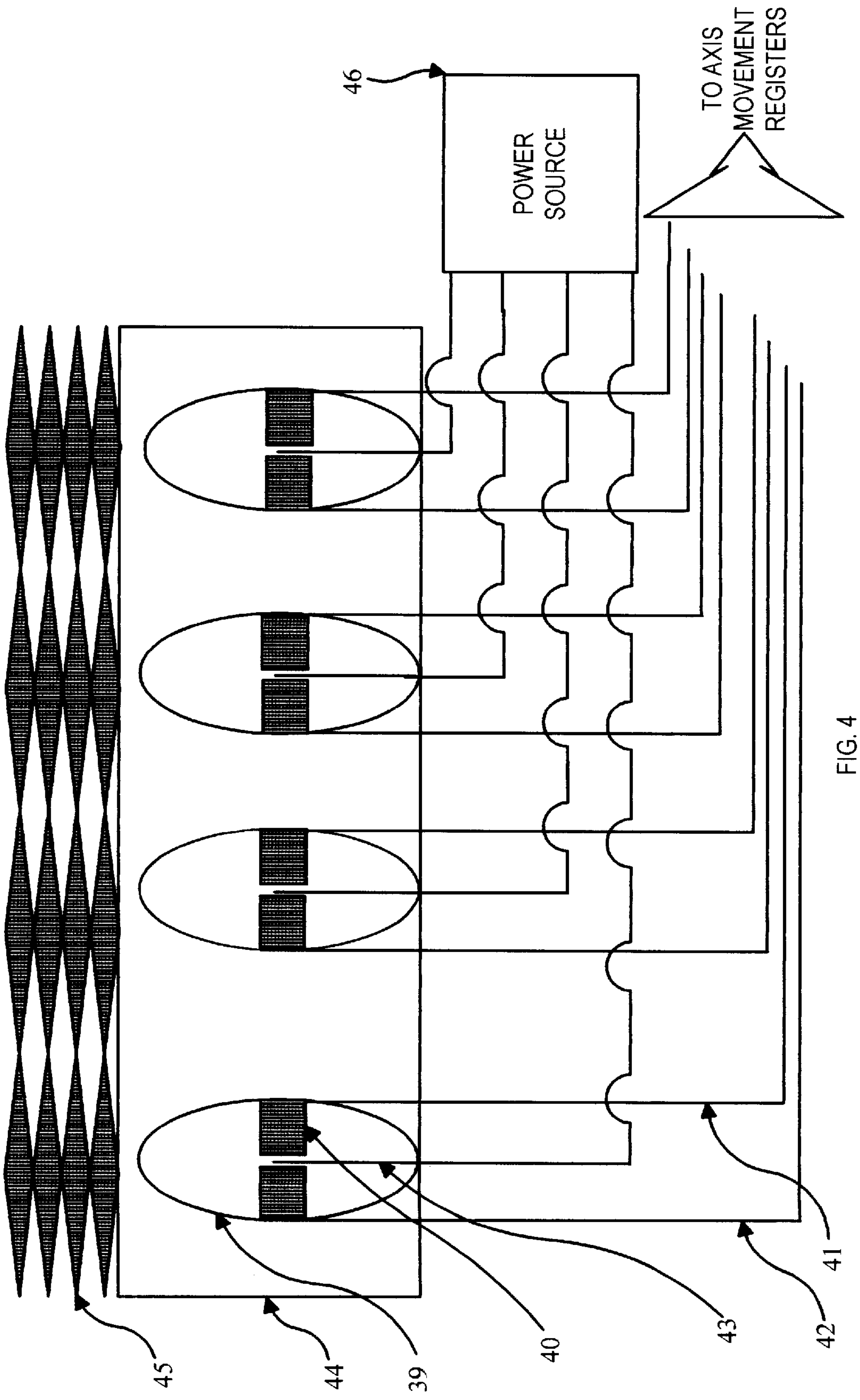
FIG. 4 is a side-view schematic of a direction sensitive motion detector for employment in the housings of FIGS. 3*a* and 3*b*.

FIG. 2 is a block diagram illustrating an electronic configuration of a motion-to-sound apparatus responsive to adjudged directional movement according to an embodiment of the present invention. As in FIG. 1, CPU 9 is coupled by means of bus line 10 to ROM 12, RAM 13 and receives input from operation input means 14 with respect to powering of the device and control of functions of sound track player 15, coupled thereto. In the embodiment of FIG. 2, CPU 9 supplies a channel select signal ("CS"), whose value is sequentially varied, to multiplexer 24 for scanning multiplexer 24 input from a plurality of axis motion detectors 19*a–c*, and optionally gravitational pull axis detectors 19*d*. Axis detectors of this embodiment may be of the type described with respect to FIG. 4, that is, multiple contact style switch members disposed such as to be responsive to movement or gravitational pull in at least one direction along an axis, and more preferably, as shown in FIG. 4, in at least two directions, negative and positive, along an axis. The output of each contact switch member is supplied to a register 20*a–h*, wherein one bit corresponds to completed electrical contact of one contact switch member. The bit pattern is compared by comparators 21*a–h* against a standard threshold pattern pre-determined to be indicative of a detector being moved in a particular direction, e.g. 50% or more of the contact switch members being in a state indicative of movement. The bit pattern supplied to each positive axis movement register is compared to the bit pattern supplied to each negative axis movement register (e.g. 20*a* v. 20*b*, 20*c* v. 20*d*, 20*e* v. 20*f*, 20*g* v. 20*h*) along a particular axis by corresponding comparators 22*a–d*. Upon determining the predominant direction of movement along a particular axis, comparators 22*a*–22*d* input such bit data into registers 23*a–d*. CPU 9 scans the outputs of registers 23*a–d* through multiplexer 24 upon receipt of a KON signal from key switch 18, and subsequent transmission of CS, and from such outputs controls sound track player 15 according to a pre-programmed instruction set with regard to motion in 3-dimensional space and in accordance with input from operation input means 14.

Figure 3A:
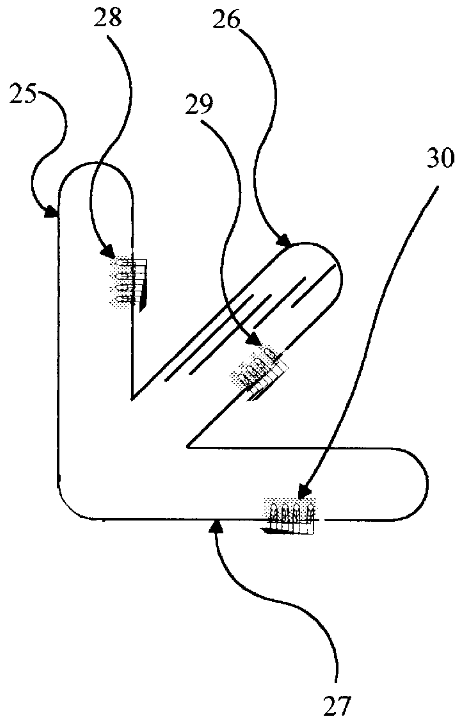
FIGS. 3*a* and 3*b* are side views of fluid-filled housings having a plurality of direction sensitive detectors, as shown in more detail in FIG. 4, positioned such that directional motion may be discerned along a plurality of axes.
Figure 3B:
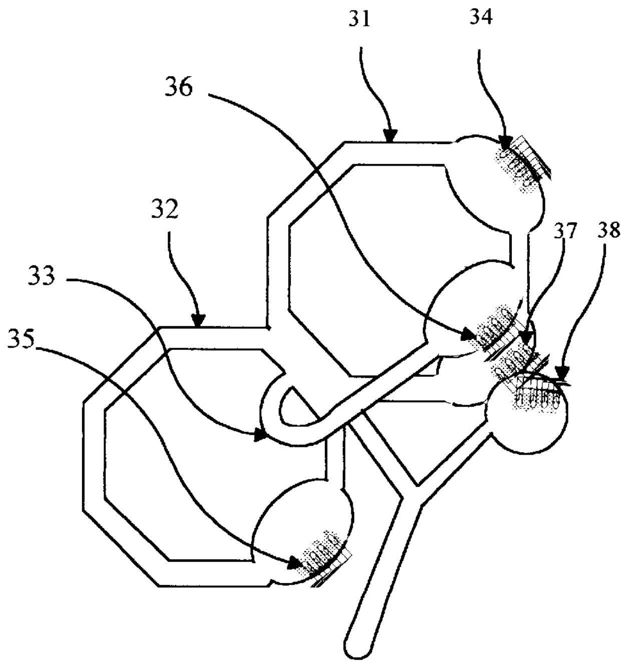

FIGS. 3*a* and 3*b* are side views of fluid-filled housings having a plurality of direction-sensitive detectors, as shown in more detail in FIG. 4, positioned such that directional motion may be discerned along a plurality of axes. As illustrated in FIG. 3*a*, preferably the housing is constructed such that direction sensitive detectors 28, 29 and 30 may be positioned along different axes, as illustrated, the x-axis 25, the y-axis 27 and z-axis 26, respectively. The fluid, which is preferably a liquid, within the housing, is preferably of such density and/or viscosity, and of such volume, as to maximize the movement of the members comprising the direction sensitive detectors (as seen more clearly in FIG. 4) when motion along the axis in which the detector is disposed is made. As illustrated in FIG. 3*b*, disposition of direction sensitive detectors may, by appropriate construction of the housing, be such that the housing resembles the appearance of the human vestibular apparatus. In this regard, conduits 32 and 31 correspond to the superior and inferior semi-circular canals, respectively, conduit 33 to the external semi-circular canal and chamber 38 to the saccule. Motion detectors 34 and 36 are positioned similarly to the ampullae of the vestibular apparatus, while motion detectors 37 and 38 correspond to the maculae and otoconia, and motion detector 35 to the crista ampullaris.

FIG. 4 is a side-view schematic of a direction sensitive motion detector for employment in the housings of FIGS. 3*a* and 3*b*. Direction-sensitive motion detector of FIG. 4 is comprised of a number of contact switch members 39 having a flexible housing to which is attached a number of contact members 40. Contact members 40 are connected via multiple leads, such as leads 42 and 41, to negative and positive axis movement registers segregated so as to register contacts indicative of motion in a single direction (i.e. positive or negative). The housing of flexible contact switch members 39 further houses a semi-rigid conductor member 43 which is coupled to power source 46 and is disposed so as to statically reside between the number of contact members 40 without touching the same. The contact switch members 39 are further housed in a vibration-sensitive medium 44 such as a gelatinous material. The vibration-sensitive medium 44 may be conjoined in whole or in part with a substance of higher density 45 to enhance displacement of the vibration-sensitive medium upon directional movement along an axis. Displacement of vibration-sensitive medium 44 results in displacement of the housings of contact switch members 39 thereby eventuating in movement of contact members 40 with respect to conductor members 43 and electrical contact between the same.

Figure 5:
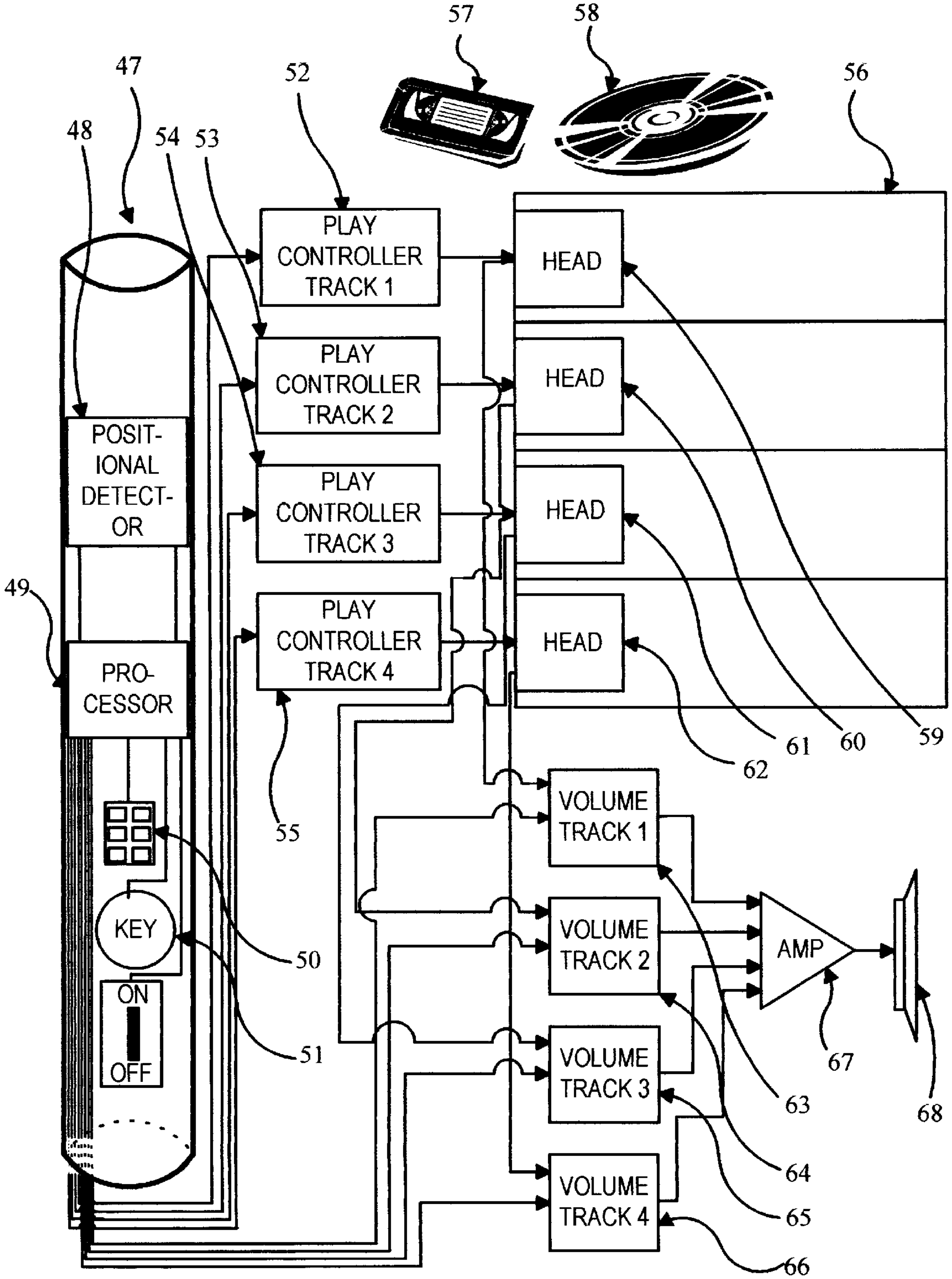
FIG. 5 is a block diagram showing the layout of a motion-to-sound system comprising a hand held embodiment of the present invention.

FIG. 5 is a block diagram showing the layout of a motion-to-sound system comprising a hand-held embodiment of the present invention in the form of wand 47. Wand 47 comprises a housing having positional or movement detector 48, processor 49, operation input means 50, KON key 51 and on-off power switch. Processor 49 receives input from positional or direction detector 48 and upon receipt of a KON signal produced by activation of KON key 51 adjudges position of wand 47 or the direction of movement of wand 47. Position or direction of movement input received by processor 49 is used along with input from operation input means 50 to adjust the CC signals of processor 49 so as to effectuate desired changes in the sound play. As illustrated, processor 49 provides output to independently control sound track play and sound track volume. Processor 49 in conformity with programming instructions with respect to directional movement or wand position, and operational inputs, controls which track or tracks of tape(s) 57 or disc(s) 58 in multi-track player 56 is/are to receive predominant or solitary auditory attention over other available tracks by means of a number of play controllers 52–55 directed to different play heads 59–62. Processor 49 also permits control of sound track volume by means of track volume controllers 63–66. Signals are amplified by amplifier 67 and converted to auditory sound by speaker 68.

Figure 6:
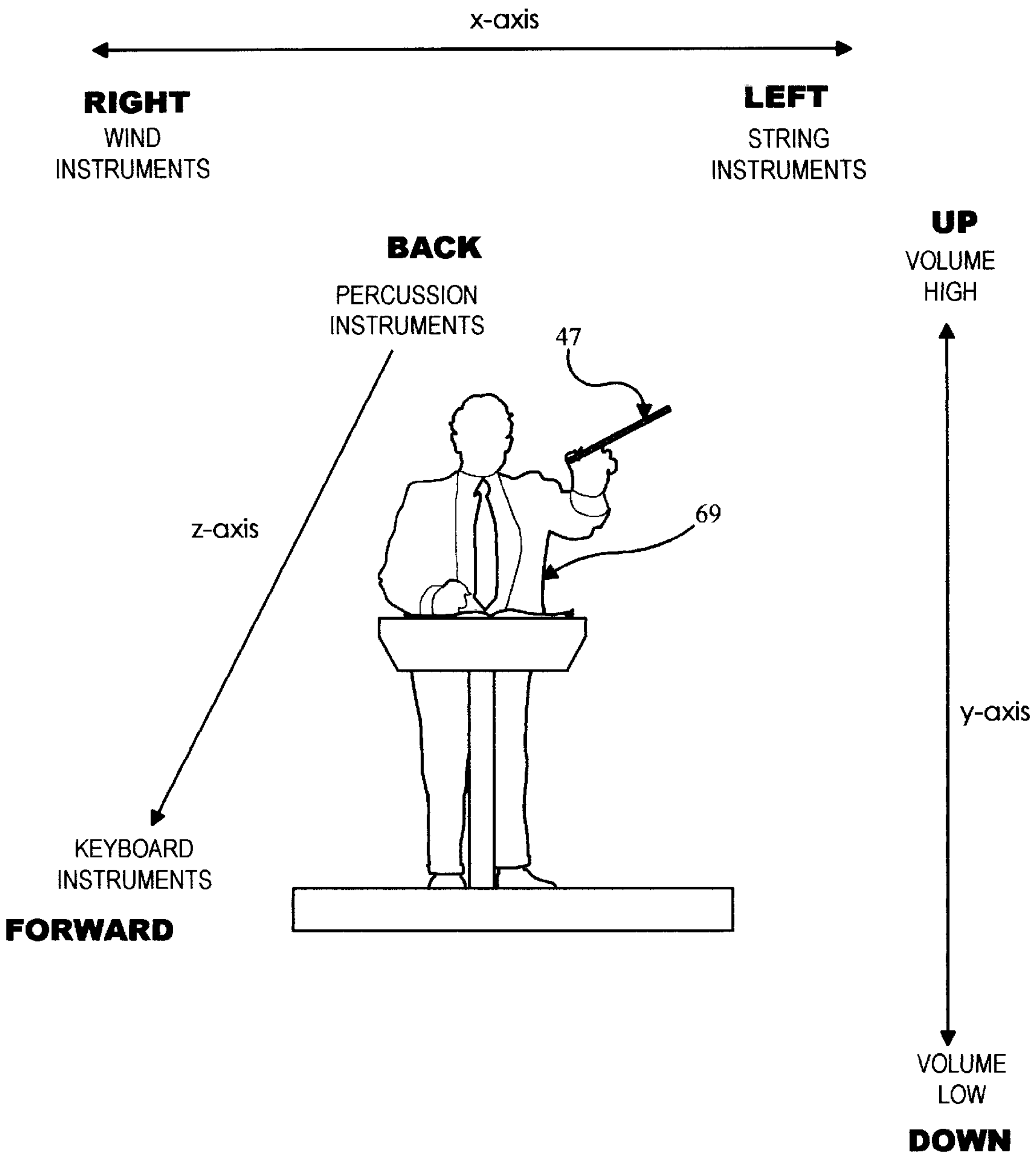
FIG. 6 is a front view of a performer utilizing the motion-to-sound system of FIG. 5 illustrating directional sound control.

FIG. 6 is a frontal view of a performer 69 to whom the motion-to-sound apparatus of FIG. 4 is provided, illustrating one of many possible directional sound control options available. As illustrated, movement of wand 47 towards the right activates predominantly the sound track with respect to wind instruments, movement to the left with respect to string instruments, forward movement with respect to keyboard instruments, and backward movement with respect to percussion instruments. Up and down movement along the y-axis is shown to control the volume of the play with respect to the predominant track. Operation control means may be used to dictate the length of play of a particular track, to turn off the play of one track, or control other parameters such as tone, pitch etc. of a track, so as to control the ambiance of the entire musical score played.

Figure 7:
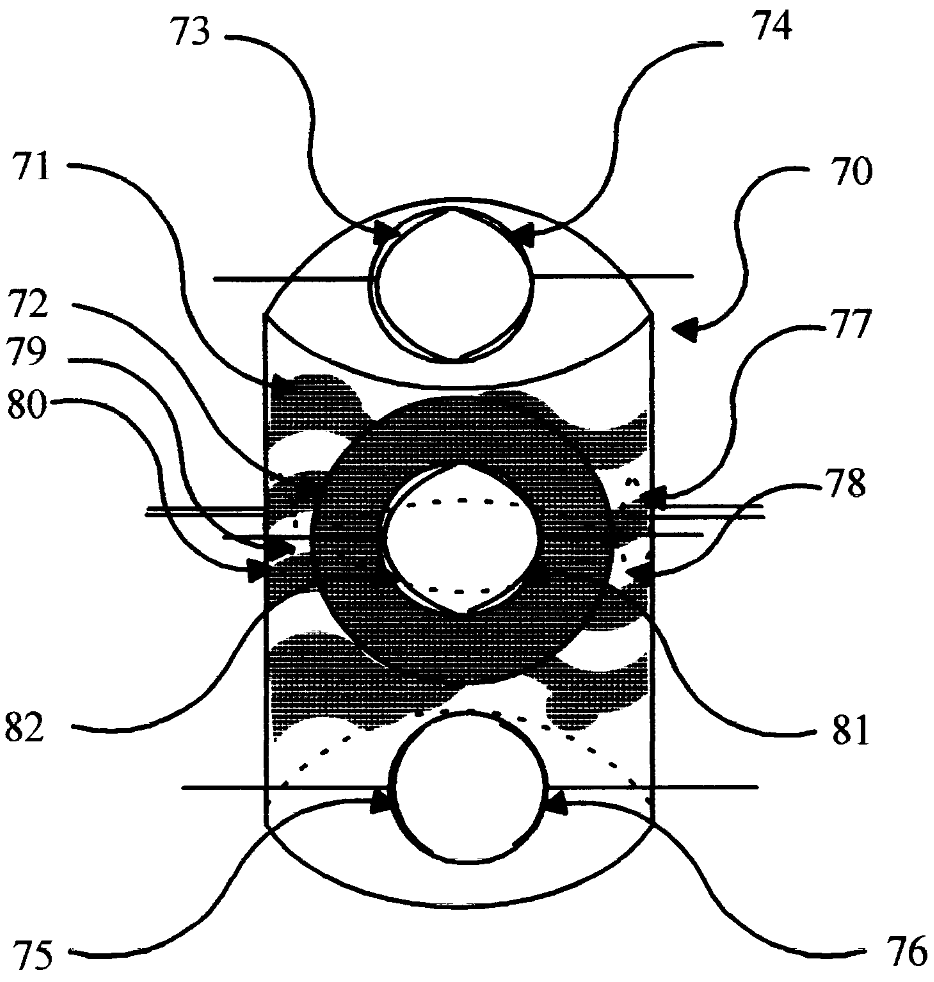
FIG. 7 is a perspective view of a directional motion detector providing for detection of movement along the x, y or z axis.

FIG. 7 is a perspective view of a directional motion detector providing for detection of movement along the x, y or z axis which may find employment in the present invention. Directional motion detector 70 comprises a housing having an outer surface and an inner surface, a relatively non-conducting fluid 71 disposed in the housing, one or more paired electrical contacts (73/74, 75/76, 77/78, 78/79, 81/82) (paired contacts antipodal to 81/82 not shown) disposed along the inner surface of the housing, and a conducting object 72 of such density and buoyancy such as to remain suspended in relatively non-conducting fluid 71 at a static position so as to be non-contactedly approximately equidistant from each set of paired electrical contact members and of such size and shape as to permit contact with preferably only one pair of electrical contact members when motion along one axis is made.

Figure 9A:
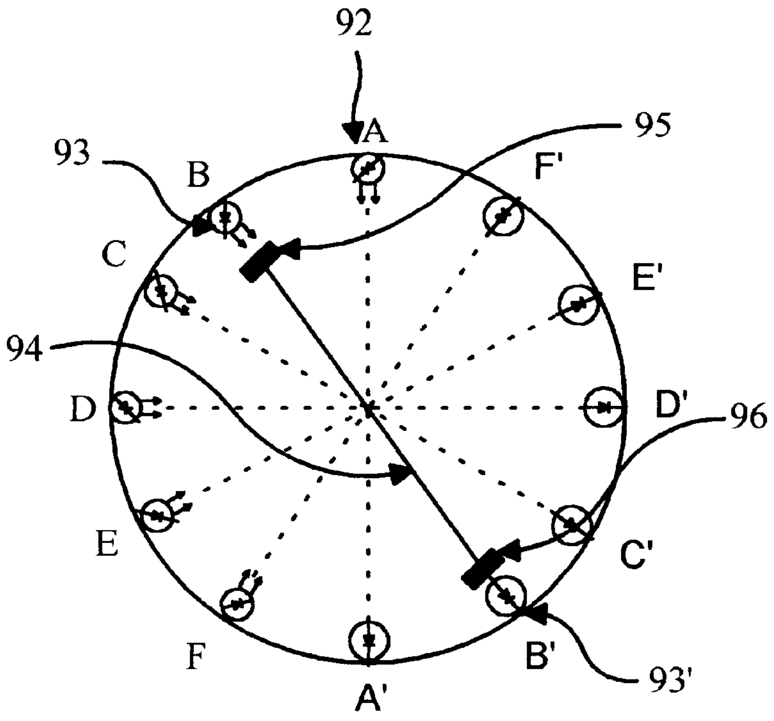
FIG. 9*a* and 9*b* illustrate two perspective views of a position-direction motion detector providing for detection of position along the x, y or z axis.
Figure 9B:
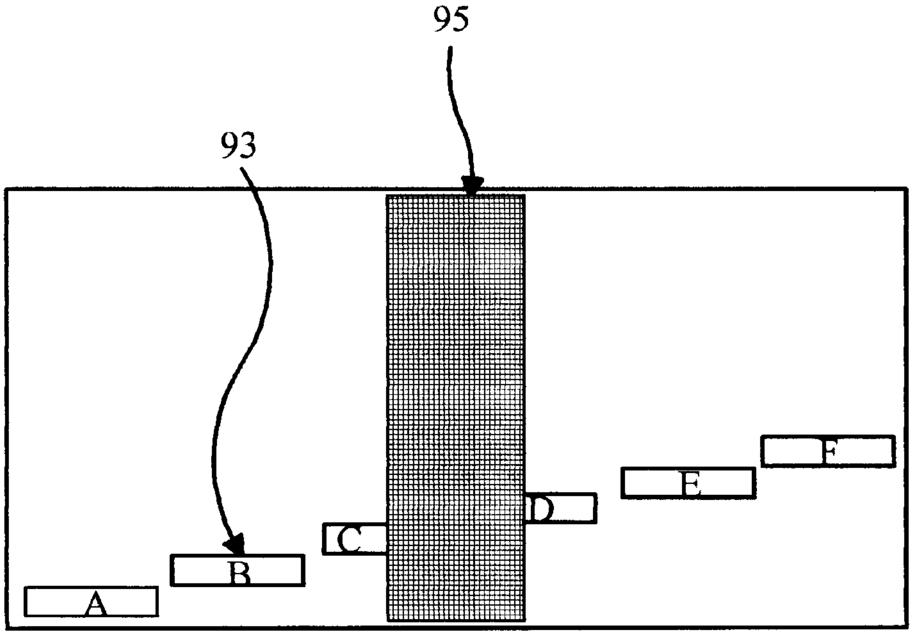

Now referring to FIG. 9, there are shown perspective views of a position-direction motion detector providing for detection of position and/or motion direction along the x, y or z axis. As can be seen more easily in cross-sectional view FIG. 9*a*, position-direction motion detector 92 comprises a number of paired photodiodes and photovoltaic cells (A/A', B/B', C/C', D/D', E/E', F/F'). Such photo-pairs are disposed in such a manner that the interaction of one photo-pair does not interfere with the interaction of another photo-pair as in a manner shown in FIG 9*b* (corresponding photovoltaic cells not shown). Position-direction motion detector 92 further comprise rotatable magnetically responsive member 94 having interfering ends 95 and 96 for blocking interaction between photo-pairs, as illustrated 93 and 93'. Since the earth's magnetic field will cause magnetically responsive member 94 to be directed in a certain direction (e.g. north as in a compass), orienting such a position-direction motion detector 92 along the x, y and z axis permits a processing means (not shown) to process data with respect to the pair or pairs of photodiode-photovoltaic cell interactions interfered with by each magnetically responsive member of each position-direction motion detector 92 in a set period of time and from such data to determine the direction of movement as well as the final position.

Figure 8:
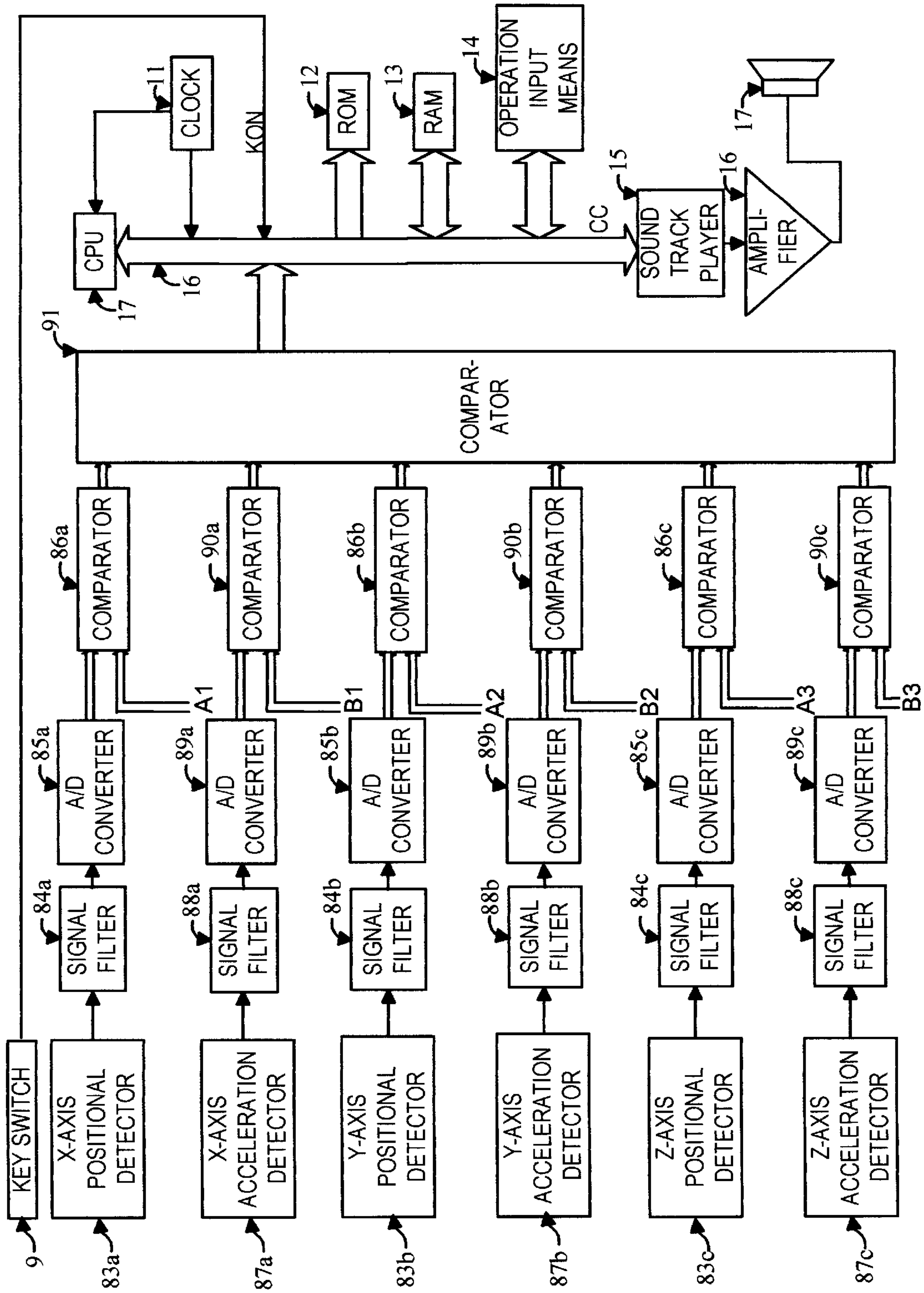
FIG. 8 is a block diagram showing an electronic configuration of a motion-to-sound apparatus for producing sounds responsive both to the final position of the detector in space and the acceleration of the device towards that position.

Now referring to FIG. 8, there is illustrated a block diagram showing an electronic configuration of a motion-to-sound apparatus for producing sounds responsive both to the final position, or direction of movement, of the detector in space and the acceleration of the device towards that position or along that plane. By coupling such information, and correlating the same to sound production, intuitive sounds can produced. For example, a quick raising of the hand into a superior position may cause the sound of punching to occur, while slowly raising the hand into the same superior position may cause the sound of clapping to occur (as if the person had raised his hand in greeting). Motion detection in the x-plane is made by means of x-axis positional/directional detector 83*a* in conjunction with x-axis acceleration detector 87*a*. Motion detection in the y-plane is made by means of y-axis positional/directional detector 83*b* and y-axis acceleration detector 87*b*. Motion in the z-plane is made by means of z-axis positional/directional detector 83*c* and z-axis acceleration detector 87*c*. Signals generated by each of these detectors is filtered by corresponding signal filter 84*a*, 88*a*, 84*b*, 88*b*, 84*c*, 88*c*, such that signals only above a certain threshold are passed on to corresponding analog-to-digital converter 85*a*, 89*a*, 85*b*, 89*b*, 85*c*, 89*c*. Analog-to-digital converters pass digitalized data with respect to signal input to corresponding comparators 86*a*, 90*a*, 86*b*, 90*b*, 86*c*, 90*c* which compares such data against corresponding pre-determined threshold values (A1, B1, A2, B2, A3, B3) permitting output only of data meeting the threshold values. Output from comparators 86*a*, 90*a*, 86*b*, 90*b*, 86*c*, 90*c* may be directly input into busline 16 for co-processing by CPU 17 or may be compared in comparator 91 such that only a predominant axis movement and corresponding acceleration is output for processing by CPU 17. CPU 17 co-processes information pertaining to the movement/position and acceleration and based on a look-up table sends a CC to sound track player 15.

Figure 10:
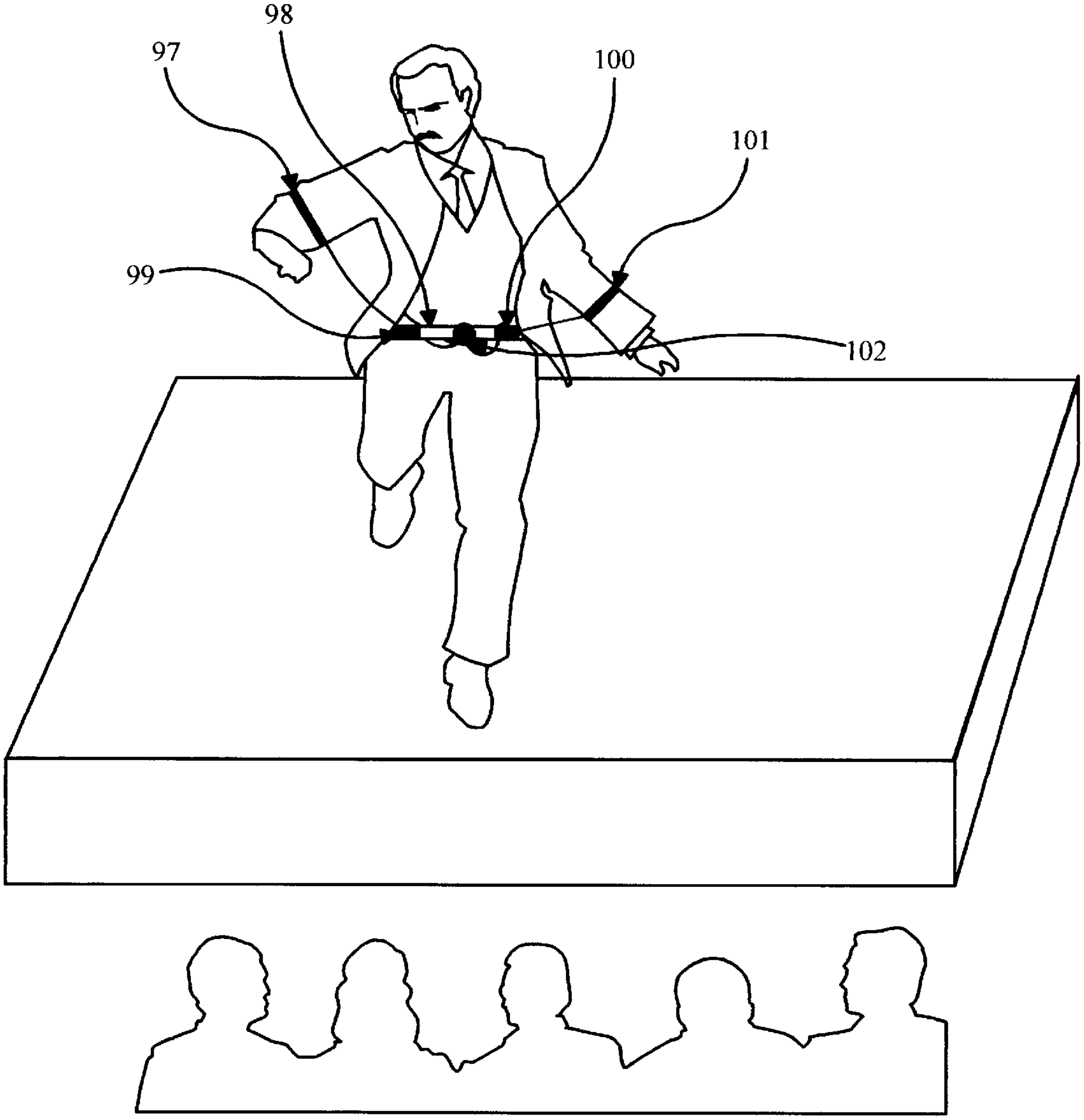
FIG. 10 is the outer appearance of a performer to whom motion detectors and sound control devices of the present invention are attached.

And, now referring to FIG. 10, there is shown the outer appearance of a performer to whom spatial motion detectors and sound control devices of the present invention are attached. Spatial motion detectors may be attached to any appendage of the performer, for example, left arm 101 and right arm 97. Output of spatial motion detectors may be directed to one or more processing units 99, 100 and associated peripherals attached to belt 98. Speaker 102, receiving output from such processing units, is preferably directed such that sound is directed away from the body of the performer.

While this application has been described in connection with certain specific embodiments thereof, it should be understood that these are by way of example rather than by way of limitation, and it is not intended that the invention be restricted thereby.

What is claimed is:

1. A motion-to-sound apparatus for producing sound in response to movement comprising:

a housing which is freely movable in three-dimensional space;

a detector capable of detecting positional movement in three dimensional space with respect to a reference point and generating a signal representative thereof, operatively connected to said housing;

a processor, operatively coupled to said detector such as to receive signal input from said detector, generating signal output responsive to said signal input from said detector;

a data storage unit capable of storing program instruction sets, said data storage unit being operatively coupled to said data processing unit;

a sound-generator capable of generating more than one multi-tone sound tracks or musical scores upon receipt of a signal from said data processor, said sound generator being electronically coupled to said data processor such as to receive input from said data processor;

a data processor program instruction set housed in said data storage unit operatively configured and adapted to direct said data processor to output a signal to said sound generator to generate a multi-tone sound track or musical score upon receipt by said data processor of one or more signals from said detectors in accordance with the positional movement of said performance unit;

wherein said data processor program instruction set varies the multi-tone sound track or musical score, or acoustical parameter with respect thereto, in regard to a plurality of positional movements in three-dimensional space as detected by said detector.

2. The motion-to-sound apparatus of claim 1 wherein said detector comprises three or more flexible conductors, each conductor in proximity to two or more electrical contacts, forming three or more conductor/contact sets, wherein at least one set is disposed along each of the positive and negative x, y and z axises of space, said flexible conductors being disposed to said contacts at such distances such that when motion is made along either the positive or negative axis of the x, y and/or z axis, one or more of said flexible conductors will make electrical contact with one or more of said contacts such that current flows between said conductor and said contact.

3. The motion-to-sound apparatus of claim 1 said detector comprises three or more flexible electrical contacts, each contact in proximity to two or more conductors, forming three or more conductor/contact sets, wherein at least one set is disposed along each of the positive and negative x, y and z axises of space, said flexible contacts being disposed to said conductors at such distances such that when motion is made along either the positive or negative axis of the x, y and/or z axis, one or more of said flexible electrical contacts will make electrical contact with one or more of said conductors such that current flows between said contact and said conductor.

4. The motion-to-sound apparatus of claim 2, wherein each of said conductor/contact sets is housed in a flexible housing member.

5. The motion-to-sound apparatus of claim 3, wherein each of said conductor/contact sets is housed in a flexible housing member.

6. The motion-to-sound apparatus of claim 2, wherein said flexible housing members are housed in a liquid-filled housing.

7. The motion-to-sound apparatus of claim 3, wherein said flexible housing members are housed in a liquid-filled housing.

8. The motion-to-sound apparatus of claim 1, wherein the sound-generator is a multi-soundtrack player capable of playing one or more recorded sound tracks at a time.

9. The motion-to-sound apparatus of claim 1, wherein the detector measures absolute position with respect to a reference point.

10. The motion-to-sound apparatus of claim 1, wherein the detector's reference point is the earth's magnetic center.

11. The motion-to-sound apparatus of claim 1, wherein said detector measures direction of motional forces from a reference point.

12. The motion-to-sound apparatus of claim 1, wherein said detector measures change in spatial position.

13. The motion-to-sound apparatus of claim 1, further comprising one or more filter(s) for passing signals of a pre-determined magnitude coupled to one ore more comparator(s) for comparing passed signals from the filter(s) so as to determine the predominant axis of movement.

14. The motion-to-sound apparatus of claim 1, further comprising a acceleration detector providing signal input to said processor.

15. The motion-to-sound apparatus of claim 1, wherein the multitone sound track is human speech.

16. The motion-to-sound apparatus of claim 1 wherein the data processor instruction set is operatively configured and adapted to cause the sound produced with respect to a detected motion to be intuitive to the motion.

17. The motion-to-sound apparatus of claim 1 wherein detector further measures the velocity of a movement along the x, y and z spacial orientations.

18. The motion-to-sound apparatus of claim 1, wherein the detector further measures the acceleration of a movement along the x, y and z spatial orientations.

19. A motion detector employed in a motion-to-sound apparatus comprising:

a housing having an outer surface and an inner surface, said inner surface enclosing a void;

two or more photodiodes capable of emitting light upon activation, said photodiodes being disposed along the inner surface of said housing in such a manner as to emit light into said void upon activation of one or more of said photodiodes;

two or more photovoltaic cells capable of generating signal output when exposed to light, said photovoltaic cells being disposed along the inner surface of said housing in such a manner as to be capable of intercepting light emitted from only one of said two or more photodiodes when one or more of said photodiodes is activated, a photovoltaic cell capable of intercepting light from a particular photodiode and the photodiode which is capable of emitting light to such photovoltaic cell comprising a photodiode-photovoltaic cell pair;

a pivot member disposed within said void;

a magnetically-responsive member pivoted to said pivot member within said void such as to be capable of rotation about such pivot, said magnetically-responsive member being capable of interfering with the interaction of one or more photodiode-photovoltaic cell pairs at a time as the position of said magnetically responsive member in a directed magnetic field is changed; and a processor coupled to said photovoltaic cells processing signal-output from said photovoltaic cells with respect to the pair or pairs of photodiode-photovoltaic cell interactions interfered with by the magnetically responsive member in a set period of time.

20. A motion detector employed in a motion-to-sound apparatus comprising:

a spherical housing having an outer surface and inner surface, said inner surface enclosing a void;

a plurality of photodetectors dispersedly disposed along the inner surface of said spherical housing, said photodetectors generating signal-output upon activation by monochromatic light;

angular reference element disposed within said void of said spherical housing in such a manner as to be freely rotatable therein;

a monochromatic light emitting source positioned on said angular reference element;

a processor coupled to said photodetectors for processing signal-output from activated photodetectors and adjudging the direction and/or velocity of motion of said spherical housing from the photodetectors which are activated over a set period of time;

a connection for operatively coupling the signal produced by a photodetector exposed to said monochromatic light with said processor.

* * * * *